(12) United States Patent
Wang et al.

(10) Patent No.: US 11,356,727 B2
(45) Date of Patent: Jun. 7, 2022

(54) CIRCUIT INTEGRATED WITH VOICE WAKE-UP FUNCTION, TELEVISION AND VOICE CONTROL METHOD

(71) Applicant: KONKA GROUP CO., LTD., Shenzhen (CN)

(72) Inventors: Qin Wang, Shenzhen (CN); Chunmeng Ye, Shenzhen (CN); Minqiang Lin, Shenzhen (CN)

(73) Assignee: KONKA GROUP CO., LTD., Shenzhen (CN)

( * ) Notice: Subject to any disclaimer, the term of this patent is extended or adjusted under 35 U.S.C. 154(b) by 0 days.

(21) Appl. No.: 17/057,253

(22) PCT Filed: May 28, 2019

(86) PCT No.: PCT/CN2019/088845
§ 371 (c)(1),
(2) Date: Nov. 20, 2020

(87) PCT Pub. No.: WO2019/228357
PCT Pub. Date: Dec. 5, 2019

(65) Prior Publication Data
US 2021/0195274 A1    Jun. 24, 2021

(30) Foreign Application Priority Data
May 29, 2018    (CN) .......................... 201810531331.6

(51) Int. Cl.
*H04N 21/422* (2011.01)
*G10L 15/22* (2006.01)

(52) U.S. Cl.
CPC ....... *H04N 21/42203* (2013.01); *G10L 15/22* (2013.01); *G10L 2015/223* (2013.01)

(58) Field of Classification Search
CPC ........... H04N 21/42203; H04N 21/443; H04N 21/4436; G10L 2015/223; G10L 15/22
See application file for complete search history.

(56) References Cited

U.S. PATENT DOCUMENTS

| | | | |
|---|---|---|---|
| 2012/0226502 A1* | 9/2012 | Ouchi | H04N 21/42203 704/275 |
| 2015/0163558 A1* | 6/2015 | Wheatley | H04N 21/6587 725/12 |

(Continued)

FOREIGN PATENT DOCUMENTS

| | | |
|---|---|---|
| CN | 101211504 A | 7/2008 |
| CN | 101753871 A | 6/2010 |

(Continued)

OTHER PUBLICATIONS

World Intellectual Property Organization (WIPO) International Search Report for PCT/CN2019/088845 dated Aug. 28, 2019 6 Pages.

*Primary Examiner* — Michael B. Pierorazio
(74) *Attorney, Agent, or Firm* — Anova Law Group, PLLC

(57) ABSTRACT

Circuit integrated with voice wake-up function, television and voice control method. The circuit integrated with voice wake-up function comprises television mainboard and far-field voice module. The far-field voice module comprises: microphone unit for collecting voice simulation signal; analog-digital conversion unit for converting voice simulation signal to digital signal; main control unit for processing converted digital signal and outputting same to television mainboard; and voice wake-up unit for processing voice simulation signal and outputting wake-up signal to television mainboard. Microphone unit is connected to analog-digital conversion unit and voice recognition unit, respectively; analog-digital conversion unit is connected to main control unit and television mainboard, respectively; and (Continued)

television mainboard is connected to main control unit and voice wake-up unit, respectively.

13 Claims, 3 Drawing Sheets

(56) References Cited

U.S. PATENT DOCUMENTS

| | | | | |
|---|---|---|---|---|
| 2016/0135047 | A1* | 5/2016 | Park | G10L 15/22 455/411 |
| 2016/0203343 | A1* | 7/2016 | Soffer | G06F 13/4022 726/34 |
| 2017/0163926 | A1* | 6/2017 | Fang | H04N 21/4432 |
| 2017/0329386 | A1* | 11/2017 | Winemiller | G06F 1/3253 |

FOREIGN PATENT DOCUMENTS

| | | |
|---|---|---|
| CN | 102740028 A | 10/2012 |
| CN | 202679498 U | 1/2013 |
| CN | 103607611 A | 2/2014 |
| CN | 203457266 U | 2/2014 |
| CN | 104538030 A | 4/2015 |
| CN | 104575504 A | 4/2015 |
| CN | 105100659 A | 11/2015 |
| CN | 206021903 U | 3/2017 |
| CN | 207321416 U | 5/2018 |
| CN | 108877802 A | 11/2018 |

* cited by examiner

CIRCUIT INTEGRATED WITH VOICE WAKE-UP FUNCTION, TELEVISION AND VOICE CONTROL METHOD

CROSS-REFERENCES TO RELATED APPLICATIONS

This application is a national stage application of PCT Patent Application No. PCT/CN2019/088845, filed on 28 May 2019, which claims priority to Chinese Patent Application No. 201810531331.6, filed on 29 May 2018, the content of all of which is incorporated herein by reference.

FIELD OF THE DISCLOSURE

The present disclosure relates to the technical field of intelligent televisions, in particular to a circuit integrated with a voice wake-up function, a television and a voice control method.

BACKGROUND

At present, in order to enable a television product to have better user experience, the flagship televisions of major television manufacturers take a built-in far-field voice function as a large selling point one after another to realize voice interaction without a remote controller. However, the conventional far-field voice technology cannot achieve a real standby wake-up function, namely awakening the television under the condition that the overall power consumption is lower than 0.5 W. The conventional standby awakening technology is false standby, that is, the television mainboard still works normally, and only the backlight display is turned off, so that consumers cannot see anything displayed from the television screen, thereby misleading consumers to think that it is a true standby mode. Compared with a true standby wake-up function, the television mainboard in the case of the false standby wake-up function is always in a loaded state, so that the power consumption is greatly increased, and the requirement of energy conservation and environmental protection is not met.

Therefore, the current technology needs to be improved and developed.

BRIEF SUMMARY OF THE DISCLOSURE

According to the above described defects, the purpose of the present disclosure is providing a circuit integrated with a voice wake-up function, a television and a voice control method, which can effectively reduce the power consumption of the complete television on the basis of realizing the local voice standby wake-up function of the television, thereby meeting the requirements of energy conservation and environmental protection.

In order to achieve the above object, the present disclosure adopts the following technical scheme.

The present disclosure provides a circuit integrated with a voice wake-up function, which includes a television mainboard and a far-field voice module. The far-field voice module includes:

a microphone unit configured for collecting an analog signal of a human voice;

an analog-to-digital conversion unit configured for converting the analog signal of the human voice into a digital signal;

a main control unit configured for processing the converted digital signal and outputting the converted digital signal to the television mainboard; and a voice wake-up unit configured for processing the analog signal of the human voice and outputting a wake-up signal to the television mainboard;

the microphone unit is respectively connected with the analog-to-digital conversion unit and a voice recognition unit, the analog-to-digital conversion unit is respectively connected with the main control unit and the television mainboard, and the television mainboard is respectively connected with the main control unit and the voice wake-up unit.

In the circuit integrated with the voice wake-up function, the voice wake-up unit comprises a voice recognition chip, a first linear voltage stabilizer and a PMOS (Positive channel Metal Oxide Semiconductor) transistor switch circuit, an IO (Input/Output) interface of the voice recognition chip is connected with an IO interface of the television mainboard, a VCC (Volt Current Condenser) end of the voice recognition chip is connected with an output end of the first linear voltage stabilizer, an input end of the first linear voltage stabilizer is connected with an output end of the PMOS transistor switch circuit, and an input end of the PMOS transistor switch circuit is connected with a 5V-STB (5V-Set Top Box) end of the television mainboard.

In the circuit integrated with the voice wake-up function, a preset voice wake-up command is stored in the voice recognition chip.

In the circuit integrated with the voice wake-up function, the model of the voice recognition chip is ISD9160.

In the circuit integrated with the voice wake-up function, the far-field voice module further comprises an encryption unit, the digital signal is an I2S signal, and the encryption unit is configured for encrypting a communication process between the main control unit and the analog-to-digital conversion unit according to an I2C protocol.

The present disclosure provides a television comprises the circuit integrated with the voice wake-up function described above.

The present disclosure provides a voice control method based on the television, which comprises steps of:

collecting by a microphone unit an analog signal of a human voice in a preset range and sending the analog signal to an analog-to-digital conversion unit when the television is in a normal working state;

converting by the analog-digital conversion unit the analog signal of the human voice into a digital signal and outputting the digital signal to a television mainboard;

processing by the television mainboard the converted digital signal and executing a corresponding feedback operation;

collecting by the microphone unit the analog signal of the human voice in a preset range and sending the analog signal to a voice wake-up unit when the television is in a standby working state;

processing by the voice wake-up unit the analog signal of the human voice and outputting a wake-up signal to the television mainboard; and switching the television from the standby working state to the normal working state after the television mainboard receives the wake-up signal.

According to the voice control method, the step of processing by the voice wake-up unit the analog signal of the human voice and outputting a wake-up signal to the television mainboard specifically comprises:

processing by the voice wake-up unit the collected analog signal of the human voice and comparing the processed signal with a preset voice wake-up command;

if the processed signal is consistent with the preset voice wake-up command, outputting the wake-up signal to the television mainboard; and if the processed signal is inconsistent with the preset voice wake-up command, outputting no wake-up signal to the television mainboard.

According to the voice control method, the step of converting by the analog-digital conversion unit the analog signal of the human voice into a digital signal and outputting the digital signal to a television mainboard specifically comprises:

converting by the analog-digital conversion unit the analog signal of the human voice into the digital signal;

encrypting the converted digital signal by the encryption unit; and sending by the analog-digital conversion unit the encrypted digital signal to the main control unit.

Compared with the prior art, the present disclosure provides a circuit integrated with a voice wake-up function, a television and a voice control method, wherein the circuit integrated with the voice wake-up function comprises a television mainboard and a far-field voice module, and the far-field voice module comprises: a microphone unit configured for collecting an analog signal of a human voice; an analog-to-digital conversion unit configured for converting the analog signal of the human voice into a digital signal; a main control unit configured for processing the converted digital signal and outputting the converted digital signal to the television mainboard; and a voice wake-up unit configured for processing the analog signal of the human voice and outputting a wake-up signal to the television mainboard; wherein, the microphone unit is respectively connected with the analog-to-digital conversion unit and a voice recognition unit, the analog-to-digital conversion unit is respectively connected with the main control unit and the television mainboard, and the television mainboard is respectively connected with the main control unit and the voice wake-up unit. The present disclosure can effectively reduce the power consumption of the complete television on the basis of realizing the local voice standby wake-up function of the television, thereby meeting the requirements of energy conservation and environmental protection.

DETAILED DESCRIPTION OF EMBODIMENTS

In view of the above deficiencies of the prior art, it is an object of the present disclosure to provide a circuit integrated with a voice wake-up function, a television and a voice control method. In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described herein are used to explain the present disclosure only, instead of limiting the present disclosure.

Figure 1:
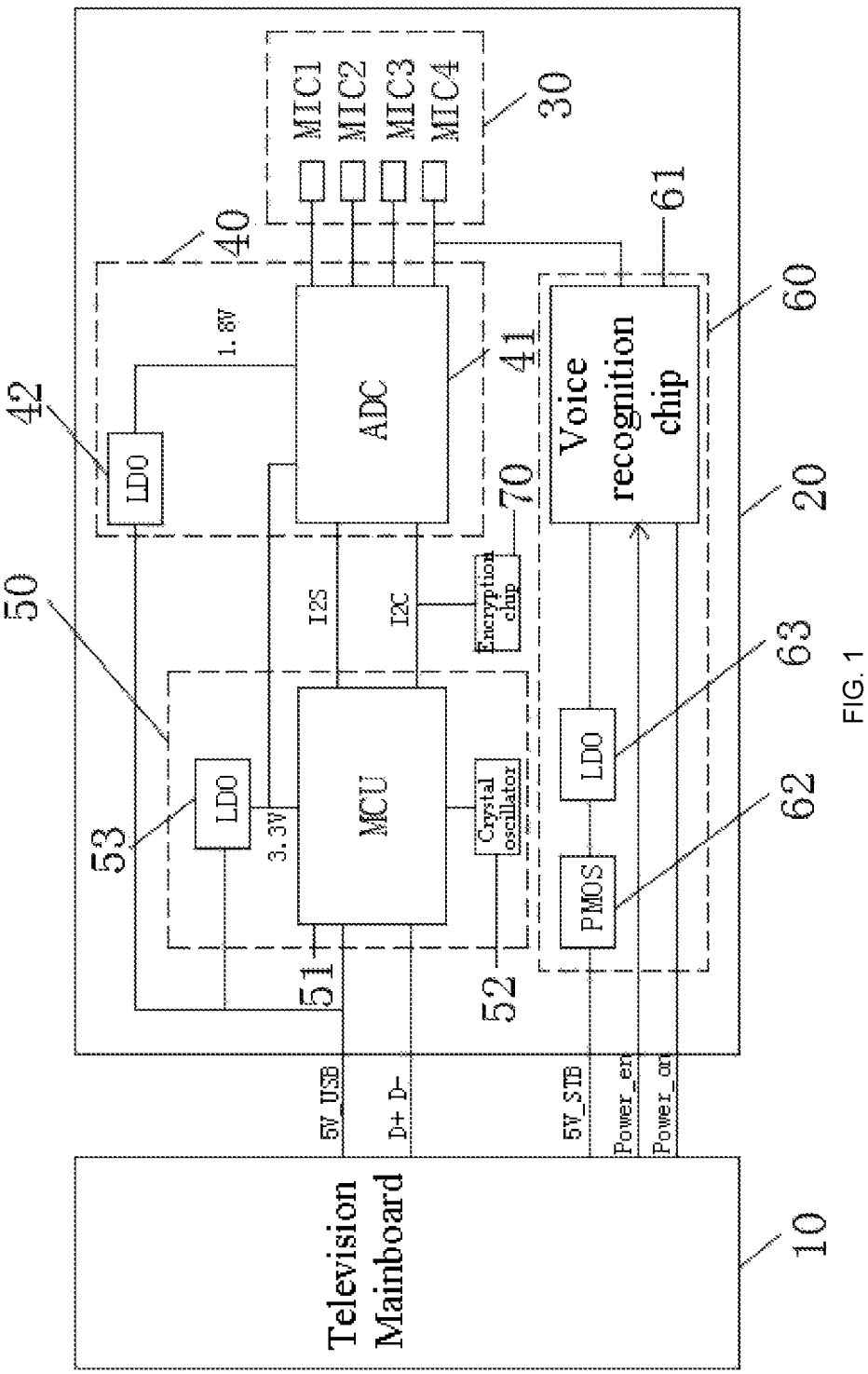
FIG. 1 is a block diagram of a circuit integrated with a voice wake-up function provided by the present disclosure.

Referring to FIG. 1, a block diagram of a circuit integrated with a voice wake-up function provided by the present disclosure includes a television mainboard 10 and a far-field voice module 20, and the far-field voice module 20 includes:

a microphone unit 30 configured for collecting an analog signal of a human voice;

an analog-to-digital conversion unit 40 configured for converting the analog signal of the human voice into a digital signal;

a main control unit 50 configured for processing the converted digital signal and outputting the converted digital signal to the television mainboard 10;

a voice wake-up unit 60 configured for processing the analog signal of the human voice and outputting a wake-up signal to the television mainboard 10.

The microphone unit 30 is respectively connected with the analog-to-digital conversion unit 40 and the voice recognition unit, the analog-to-digital conversion unit 40 is respectively connected with the main control unit 50 and the television mainboard 10, and the television mainboard 10 is respectively connected with the main control unit 50 and the voice wake-up unit 60.

Additionally, the far-field voice module 20 as a whole may be connected with the television mainboard 10 by adopting a peripheral small board and interface connection mode, so that the circuit integrated with the voice wake-up function provided by the present disclosure is conveniently added to the conventional television circuit structure.

Specifically, the microphone unit 30 includes four analog MICs, including MIC1-MIC4, respectively. When a user makes a sound within a preset range, the microphone unit 30 may collect an analog signal of a corresponding human voice and transmit the analog signal to the analog-to-digital conversion unit 40 and the voice wake-up unit 60, respectively. The analog-to-digital conversion unit 40 includes an analog-to-digital converter 41 and a second linear voltage stabilizer 42, and the television mainboard 10 supplies a part of power to the analog-to-digital converter 41 after dropping down to 1.8V by a 5V_USB interface and the second linear voltage stabilizer 42.

More specifically, the main control unit 50 includes an MCU chip 51, and an information transmission form of a USB protocol is adopted between the MCU chip 51 and the television mainboard 10. USB signals are differential signals, one signal is transmitted by a pair of lines, and D+ and D− should be such a pair of differential signals responsible for transmitting Data signals, i.e. data. The differential signal is meant that when a high level is to be transmitted, one line (e.g. D+) carries a high level, while another matched line carries a low level; and when a low level is to be transmitted, D+ carries a low level, and D− carries a high level, so that the phases of the signals carried on the two lines are reversed, thus improving the ability to resist interference and then the rate of data transmission. The model of the MCU chip in this embodiment is preferably STM32F401CDU6.

Next, the main control unit 50 further includes a crystal oscillator chip 52 and a third linear voltage stabilizer 53. The television mainboard 10 may also supply power to the MCU chip 51 after dropping down to 3.3V by the 5V_USB interface and by the third linear voltage stabilizer 53, and may also supply another part of power to the analog-todigital converter 41. The crystal oscillator chip 52 may provide the MCU chip 51 with its desired clock frequency, and in this embodiment the frequency of the crystal oscillator chip 52 is selected to be 16 MHz.

In addition, the far-field voice module 20 further includes an encryption unit 70, the digital signal is an I2S signal, and the encryption unit is configured for encrypting a communication process between the main control unit 50 and the analog-to-digital conversion unit 40 according to an I2C protocol so as to protect privacy and security of the user. The encryption unit 70 can realize its function by an encryption chip. In particular, the encryption chip supporting an I2C communication interface may be selected, such as an SMEC98SC, an ESAM885A5 and the like. Of course, the selected encryption chip can realize the function of the encryption unit 70 can be used, and the specific type of the encryption chip is not limited by the present disclosure.

More specifically, the voice wake-up unit 60 includes a voice recognition chip 61, a first linear voltage stabilizer 62 and a PMOS transistor switch circuit 63, an IO interface of the voice recognition chip 61 is connected with the IO interface of the television mainboard 10, a VCC end of the voice recognition chip 61 is connected with an output end of the first linear voltage stabilizer 62, an input end of the first linear voltage stabilizer 62 is connected with the output end of the PMOS transistor switch circuit 63, and the input end of the PMOS transistor switch circuit 63 is connected with a 5V-STB end of the television mainboard 10.

A Power_en interface is a control IO interface of the television mainboard 10 for the voice recognition chip 61, and outputs a high level when the television is turned on, and outputs a low level when the television is standby. A Power_on interface is a feedback IO interface of the voice recognition chip 61 for the television mainboard 10. The Power_on outputs a high level when the television is turned on, and the Power_on outputs a low level when the television is standby.

The type of the voice recognition chip 61 is ISD9160. Of course, other voice recognition chips of different types having the same functionality are possible. ISD9160 is a voice recognition chip integrated with a local voice wake-up function, which comes with one ADC function. Also, a preset voice wake-up command is stored in the voice recognition chip 61. When an analog signal of a human voice input into the voice recognition chip 61 is converted and consistent with the preset voice wake-up command, the voice recognition chip 61 sends a wake-up signal to the television mainboard 10.

Meanwhile, the conventional MCU chip technology for processing voice digital signals and the television mainboard technology for processing various commands of the MCU chip and the voice recognition chip have been widely applied. Therefore, the MCU chip and the television mainboard are not described in detail.

In the present disclosure, the circuit integrated with the voice wake-up function is provided in the form of a peripheral small board, with an MCU+ADC+encryption chip+ISD9160 structure adopted and four analog Mics externally connected. Therefore, the television can realize the standby wake-up function of the far-field voice module under a true standby condition that the power consumption of the complete television is lower than 0.5 W. The whole circuit is simple in peripheral circuit and exquisite in design, can effectively reduce the power consumption of the complete television on the basis of realizing the local voice standby wake-up function and meet the requirements of energy conservation and environmental protection.

The present disclosure also provides a television which includes the circuit integrated with the voice wake-up function, so that the television may have the advantages described above to adapt to the development trend of science and technology.

Figure 2:
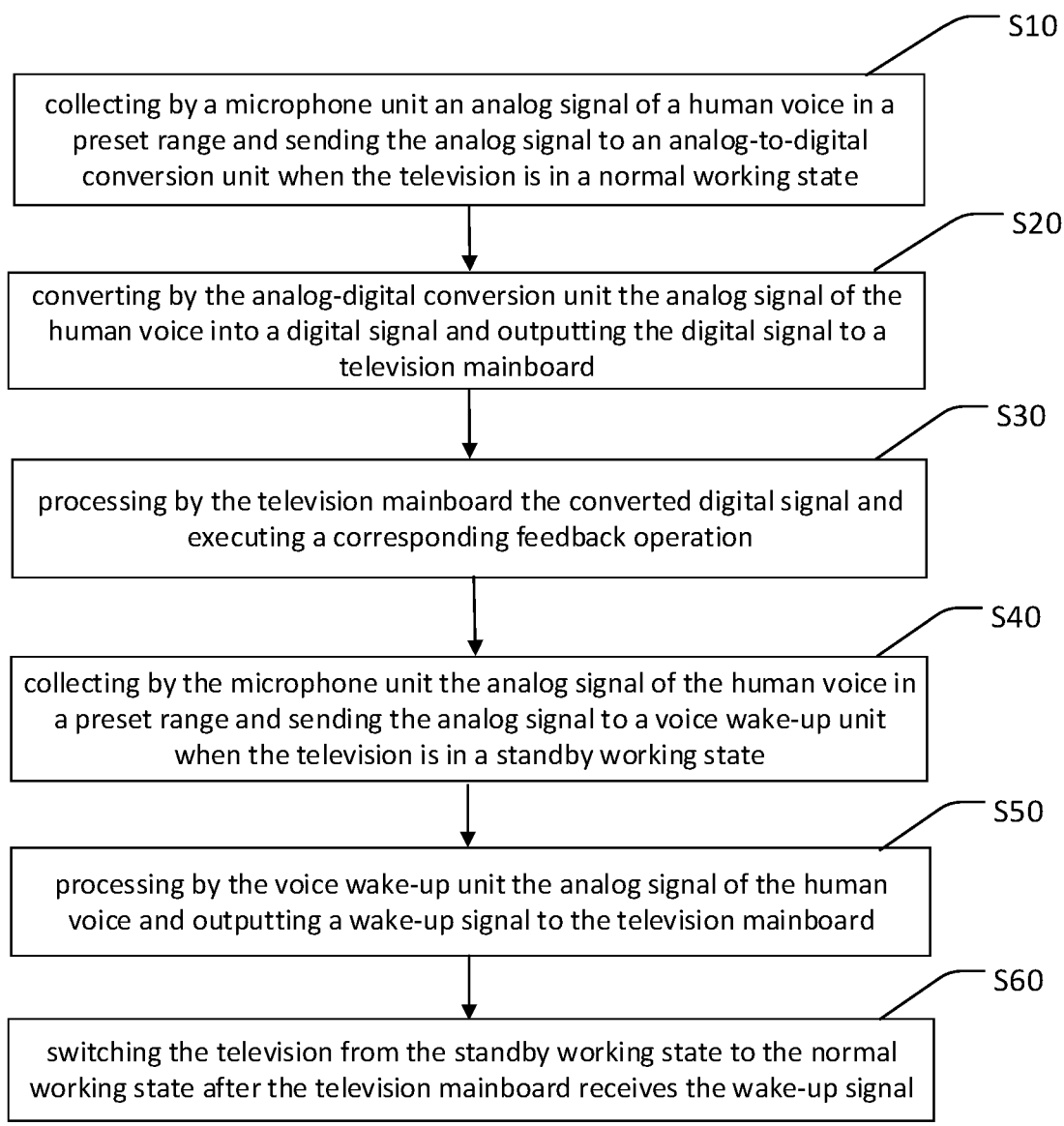
FIG. 2 is a flowchart of a voice control method of a television integrated with a voice wake-up function provided by the present disclosure.

Referring to FIG. 2, the present disclosure also provides a voice control method based on the television, which comprises the steps of:

S10, collecting by a microphone unit an analog signal of a human voice in a preset range and sending the analog signal to an analog-to-digital conversion unit when the television is in a normal working state;

S20, converting by the analog-digital conversion unit the analog signal of the human voice into a digital signal and outputting the digital signal to a television mainboard;

S30, processing by the television mainboard the converted digital signal and executing a corresponding feedback operation;

S40, collecting by the microphone unit the analog signal of the human voice in a preset range and sending the analog signal to a voice wake-up unit when the television is in a standby working state;

S50, processing by the voice wake-up unit the analog signal of the human voice and outputting a wake-up signal to the television mainboard; and S60, switching the television from the standby working state to the normal working state after the television mainboard receives the wake-up signal.

The preset range is set to be within ten meters of the circumference of the television, and the feedback operation of the television mainboard comprises channel change, volume adjustment and the like.

Figure 3:
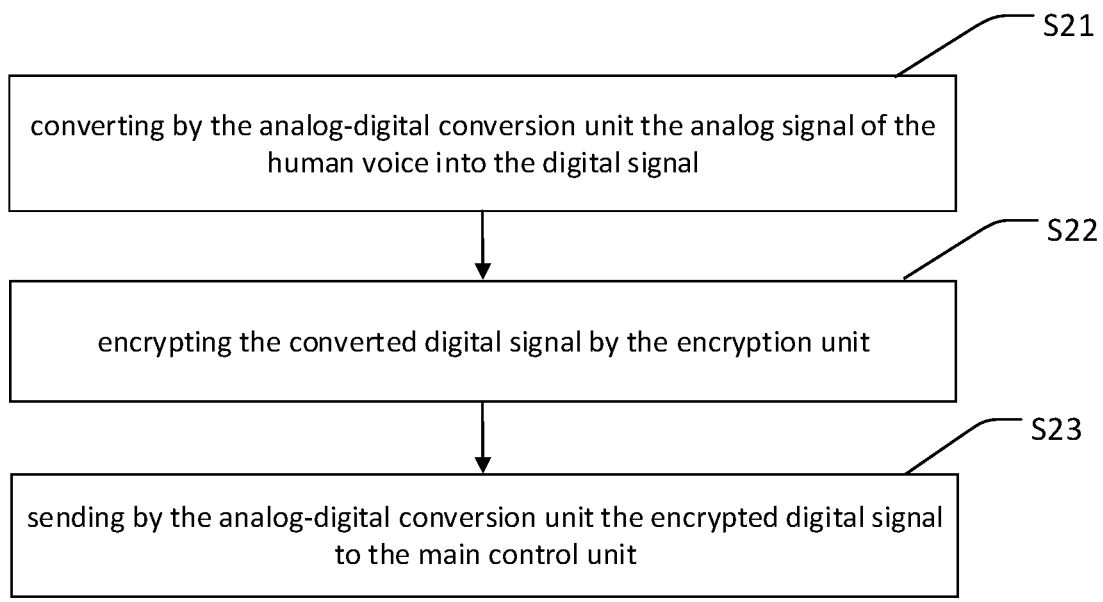
FIG. 3 is a flowchart of step S20 in the voice control method of the television integrated with the voice wake-up function according to the present disclosure.

Further, referring to FIG. 3, the step S20 specifically includes:

S21, converting by the analog-digital conversion unit the analog signal of the human voice into the digital signal;

S22, encrypting the converted digital signal by the encryption unit; and

S23, sending by the analog-digital conversion unit the encrypted digital signal to the main control unit.

When the television is normally turned on to work, a person speaks to the four MICs within a certain distance range, and the four MICs collect an analog signals of a human voice and input the analog signal to the ADC chip. The analog human voice signal is converted into a digital I2S signal by the ADC chip and transmitted to the main control chip MCU of the far-field voice module for processing, and the communication process of the ADC chip and the MCU is encrypted by the encryption chip according to the I2C protocol. The main control chip MCU processes the I2S signal transmitted by the ADC chip, converts the I2S signal into a signal D+ and a signal D− going through a USB protocol to be processed by the television mainboard, and the television mainboard gives a corresponding feedback operation, so that a complete voice interaction process is finished when the television is turned on.

Figure 4:
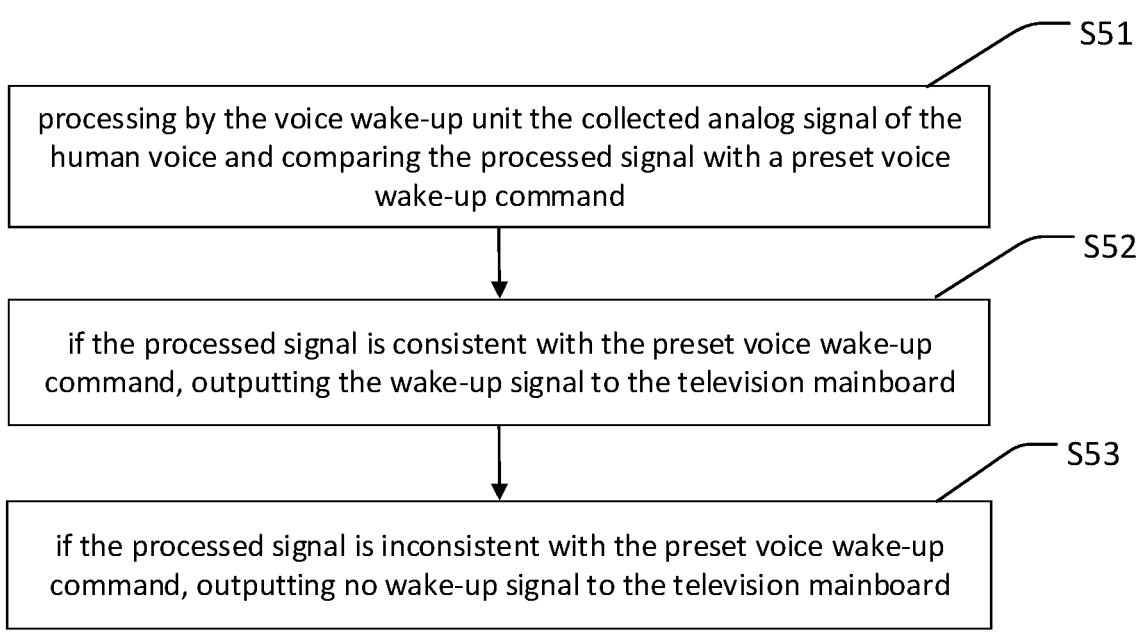
FIG. 4 is a flowchart of step S50 in the voice control method of the television integrated with the voice wake-up function provided by the present disclosure.

Further, referring to FIG. 4, the step S50 specifically includes:

S51, processing by the voice wake-up unit the collected analog signal of the human voice and comparing the processed signal with a preset voice wake-up command;

S52, if the processed signal is consistent with the preset voice wake-up command, thus outputting the wake-up signal to the television mainboard; and S53, if the processed signal is inconsistent with the preset voice wake-up command, thus outputting no wake-up signal to the television mainboard.

When the television is in a standby working state, the 5V_USB voltage supplied by the television mainboard to the far-field voice module is 0, so that the main control chip MCU, the ADC chip and the encryption chip do not work at the moment; and the television mainboard provides normal power to the 5V STB of the far field voice module and the ISD9160 operates normally. When the television is standby, the human voice wakes up the television to be turned on via a specific voice command, and the analog signal of the human voice is transmitted to the ISD9160 by the MIC 4 microphone. One ADC built in the ISD9160 processes the analog signal and converts the analog signal into a digital signal (i.e. a wake-up signal) to be processed by the television mainboard, and the television mainboard enables the television to be turned on after receiving the wake-up signal, thus completing the voice interaction process from the standby to turn-up state of the television. The human voice command corresponding to the preset voice wake-up command can be "turn on", "turn on the television", "wake up the television" and the like.

In summary, the present disclosure provides a circuit integrated with a voice wake-up function, a television and a voice control method, wherein the circuit integrated with the voice wake-up function comprises a television mainboard and a far-field voice module, and the far-field voice module comprises: a microphone unit configured for collecting an analog signal of a human voice; an analog-to-digital conversion unit configured for converting the analog signal of the human voice into a digital signal; a main control unit configured for processing the converted digital signal and outputting the converted digital signal to the television mainboard; and a voice wake-up unit configured for processing the analog signal of the human voice and outputting a wake-up signal to the television mainboard; wherein, the microphone unit is respectively connected with the analog-to-digital conversion unit and a voice recognition unit, the analog-to-digital conversion unit is respectively connected with the main control unit and the television mainboard, and the television mainboard is respectively connected with the main control unit and the voice wake-up unit. The present disclosure can effectively reduce the power consumption of the complete television on the basis of realizing the local voice standby wake-up function of the television, thereby meeting the requirements of energy conservation and environmental protection.

It can be understood that equivalent alterations or modifications may be made by one of ordinary skill in the art in light of the technical solutions of the present disclosure and its concepts, and all such alterations or modifications are intended to fall within the scope of the appended claims.

What is claimed is:

1. A circuit integrated with a voice wake-up function, comprising a television mainboard and a far-field voice module, wherein the far-field voice module comprises:
   a microphone unit configured for collecting an analog signal of a human voice;
   an analog-to-digital conversion unit configured for converting the analog signal of the human voice into a digital signal;
   a main control unit configured for processing the converted digital signal and outputting the converted digital signal to the television mainboard; and
   a voice wake-up unit configured for processing the analog signal of the human voice and outputting a wake-up signal to the television mainboard;
   wherein, the microphone unit is respectively connected with the analog-to-digital conversion unit and a voice recognition unit, the analog-to-digital conversion unit is respectively connected with the main control unit and the television mainboard, and the television mainboard is respectively connected with the main control unit and the voice wake-up unit, and
   the voice wake-up unit comprises a voice recognition chip, a first linear voltage stabilizer and a PMOS transistor switch circuit, an IO interface of the voice recognition chip is connected with an IO interface of the television mainboard, a VCC end of the voice recognition chip is connected with an output end of the first linear voltage stabilizer, an input end of the first linear voltage stabilizer is connected with an output end of the PMOS transistor switch circuit, and an input end of the PMOS transistor switch circuit is connected with a 5V-STB end of the television mainboard.

2. The circuit integrated with the voice wake-up function according to claim 1, wherein a preset voice wake-up command is stored in the voice recognition chip.

3. The circuit integrated with the voice wake-up function according to claim 1, wherein the model of the voice recognition chip is ISD9160.

4. The circuit integrated with the voice wake-up function according to claim 1, wherein the far-field voice module further comprises an encryption unit, the digital signal is an I2S signal, and the encryption unit is configured for encrypting a communication process between the main control unit and the analog-to-digital conversion unit according to an I2C protocol.

5. The circuit integrated with the voice wake-up function according to claim 1, wherein the main control unit comprises an MCU chip, and an information transmission form of a USB protocol is adopted between the MCU chip and the television mainboard.

6. A television, comprising a circuit integrated with a voice wake-up function, the circuit integrated with the voice wake-up function comprising a television mainboard and a far-field voice module, wherein the far-field voice module comprises: a microphone unit configured for collecting an analog signal of a human voice, an analog-to-digital conversion unit configured for converting the analog signal of the human voice into a digital signal, a main control unit configured for processing the converted digital signal and outputting the converted digital signal to the television mainboard, and a voice wake-up unit configured for processing the analog signal of the human voice and outputting a wake-up signal to the television mainboard;
   the microphone unit is respectively connected with the analog-to-digital conversion unit and a voice recognition unit, the analog-to-digital conversion unit is respectively connected with the main control unit and the television mainboard, and the television mainboard is respectively connected with the main control unit and the voice wake-up unit, and
   wherein the voice wake-up unit comprises a voice recognition chip, a first linear voltage stabilizer and a PMOS transistor switch circuit, an TO interface of the voice recognition chip is connected with an TO interface of the television mainboard, a VCC end of the voice recognition chip is connected with an output end of the first linear voltage stabilizer, an input end of the first linear voltage stabilizer is connected with an output end of the PMOS transistor switch circuit, and an input end of the PMOS transistor switch circuit is connected with a 5V-STB end of the television mainboard.

7. A voice control method based on the television according to claim 6, comprising the steps of:

collecting by a microphone unit an analog signal of a human voice in a preset range and sending the analog signal to an analog-to-digital conversion unit when the television is in a normal working state;

converting by the analog-digital conversion unit the analog signal of the human voice into a digital signal and outputting the digital signal to a television mainboard;

processing by the television mainboard the converted digital signal and executing a corresponding feedback operation;

collecting by the microphone unit the analog signal of the human voice in a preset range and sending the analog signal to a voice wake-up unit when the television is in a standby working state;

processing by the voice wake-up unit the analog signal of the human voice and outputting a wake-up signal to the television mainboard; and switching the television from the standby working state to the normal working state after the television mainboard receives the wake-up signal.

8. The voice control method according to claim 7, wherein the step of processing by the voice wake-up unit the analog signal of the human voice and outputting a wake-up signal to the television mainboard specifically comprises:

processing by the voice wake-up unit the collected analog signal of the human voice and comparing the processed signal with a preset voice wake-up command;

if the processed signal is consistent with the preset voice wake-up command, outputting the wake-up signal to the television mainboard; and if the processed signal is inconsistent with the preset voice wake-up command, outputting no wake-up signal to the television mainboard.

9. The voice control method according to claim 8, wherein the step of converting by the analog-digital conversion unit the analog signal of the human voice into a digital signal and outputting the digital signal to a television mainboard specifically comprises:

converting by the analog-digital conversion unit the analog signal of the human voice into the digital signal;

encrypting the converted digital signal by the encryption unit; and sending by the analog-digital conversion unit the encrypted digital signal to the main control unit.

10. The television according to claim 6, wherein a preset voice wake-up command is stored in the voice recognition chip.

11. The television according to claim 6, wherein the model of the voice recognition chip is ISD9160.

12. The television according to claim 6, wherein the far-field voice module further comprises an encryption unit, the digital signal is an I2S signal, and the encryption unit is configured for encrypting a communication process between the main control unit and the analog-to-digital conversion unit according to an I2C protocol.

13. The television according to claim 6, wherein the main control unit comprises an MCU chip, and an information transmission form of a USB protocol is adopted between the MCU chip and the television mainboard.

\* \* \* \* \*